United States Patent
Lee (10) Patent No.: US 6,564,577 B2
(45) Date of Patent: May 20, 2003

(54) SOLENOID VALVE SUPPORTER OF KIM-CHI REFRIGERATOR

(75) Inventor: Young-gil Lee, Chungcheongnam-do (KR)

(73) Assignee: Mando Climate Control Corporation (KR)

( * ) Notice: Subject to any disclaimer, the term of this patent is extended or adjusted under 35 U.S.C. 154(b) by 0 days.

(21) Appl. No.: 09/946,765

(22) Filed: Sep. 5, 2001

(65) Prior Publication Data
US 2002/0069669 A1 Jun. 13, 2002

(30) Foreign Application Priority Data
Sep. 21, 2000 (KR) .................. 2000-0055345

(51) Int. Cl.[7] .................. F25D 11/02; F25B 39/02
(52) U.S. Cl. .................. 62/525; 62/441
(58) Field of Search .................. 62/525, 441, 442; 99/468, 470, 483, 486

(56) References Cited
U.S. PATENT DOCUMENTS

| | | | | |
|---|---|---|---|---|
| 5,351,745 A | * | 10/1994 | Park .................. | 165/30 |
| 5,424,210 A | * | 6/1995 | Bae et al. .................. | 435/289 |
| 5,947,197 A | * | 9/1999 | Lee et al. .................. | 165/206 |
| 6,253,668 B1 | * | 7/2001 | Lee .................. | 99/468 |

* cited by examiner

Primary Examiner—Denise L. Esquivel
Assistant Examiner—Marc Norman
(74) Attorney, Agent, or Firm—Fish & Richardson P.C.

(57) ABSTRACT

The present invention relates to a solenoid valve supporter of Kim-chi refrigerator that guarantees the original functions of the solenoid valve with very simplified structure for mounting a plurality of solenoid valves by positioning every solenoid valve corresponding to the evaporators on one supporter body with the same intervals and flowing and emitting the refrigerants into the plurality of solenoid valves through the supporter. The Kim-chi refrigerator comprise a solenoid valve supporter S for supporting the plurality of solenoid valves S1, S2, and S3 every corresponding to the plurality of evaporator 17. The plurality solenoid valves S1, S2, and S3 are positioned on the solenoid valve supporter S with the same intervals each other, and the solenoid valve supporter S comprises a supporter body 11 having a inlet port 15 formed the lower edge central portion of the supporter body 11 and a plurality of outlet ports 18 formed corresponding to the every solenoid valve S1, S2, and S3, an inlet pipe P which sends the refrigerants from the condenser 8 to the every solenoid valve S1, S2, and S3 via inlet holes 15a inside the supporter body 11, and a plurality of outlet ports 18 which sends the refrigerants from the every solenoid valve S1, S2, and S3 to every evaporator via outlet holes 18a inside the supporter body 11.

3 Claims, 8 Drawing Sheets

SOLENOID VALVE SUPPORTER OF KIM-CHI REFRIGERATOR

BACKGROUND OF THE INVENTION (1) Field of the Invention

The present invention relates to a solenoid valve supporter of Kim-chi refrigerator, and more specifically to a solenoid valve supporter of Kim-chi refrigerator that is guaranteed of the original functions of the solenoid valve with very simplified structure for mounting a plurality of solenoid valves by positioning every solenoid valve corresponding to the evaporators on one supporter body with the same intervals and flowing and emitting the refrigerants into the plurality of solenoid valves through the supporter.

(2) Description of the Prior Art

In general, a refrigerator is a type of cooling apparatus. The refrigerants are condensed and liquefied under a high pressure by using a condenser. The condensed refrigerants are moved to an expansion valve having a tube of a small diameter. Here, the refrigerants are instantaneously vaporized in an evaporator, and thus the temperature is dropped to generate cooling air. The cooling air is supplied to a main body of the refrigerator, thus maintaining freshness of the food in the refrigerator.

The refrigerant vaporized in the evaporator by absorbing heat are moved from a compressor to a condenser, and condensed and liquefied in the condenser, discharging heat. Thereafter, the above-described procedure is repeated to perpetually perform the cooling operation.

On the other hand, a Kim-chi refrigerator introducing the refrigerating principle to ripen Kim-chi and maintain freshness of Kim-chi has been popular. Such a Kim-chi refrigerator is made small. Accordingly, while a general refrigerator has a door on its front side, the Kim-chi refrigerator has a door on its top surface in a hinge type.

The interior of the Kim-chi refrigerator contains a cooling and heating device. Accordingly, when ripening Kim-chi, the temperature inside the container is raised by making the heater a heating device operates thereby ripening Kim-chi kept in a containing room. After ripening Kim-chi properly, the heater stops and simultaneously a cooling device is operated, so the temperature of the containing room is maintained properly, thereby capable of maintaining Kim-chi with its taste and freshness for a long period of time.

Recently, a drawer type Kim-chi refrigerator has been suggested to insert a drawer into its main body. The upper opening and shutting type Kim-chi refrigerator has a Kim-chi storage room positioned vertically and the door mounted on the Kim-chi storage room to open upward, and the drawer type Kim-chi refrigerator has a drawer providing a Kim-chi storage room positioned horizontally. Recently the compound type Kim-chi refrigerator with an upper door of the upper opening and shutting type Kim-chi refrigerator and a drawer of the drawer type Kim-chi refrigerator has been developed and in use.

Figure 1A:
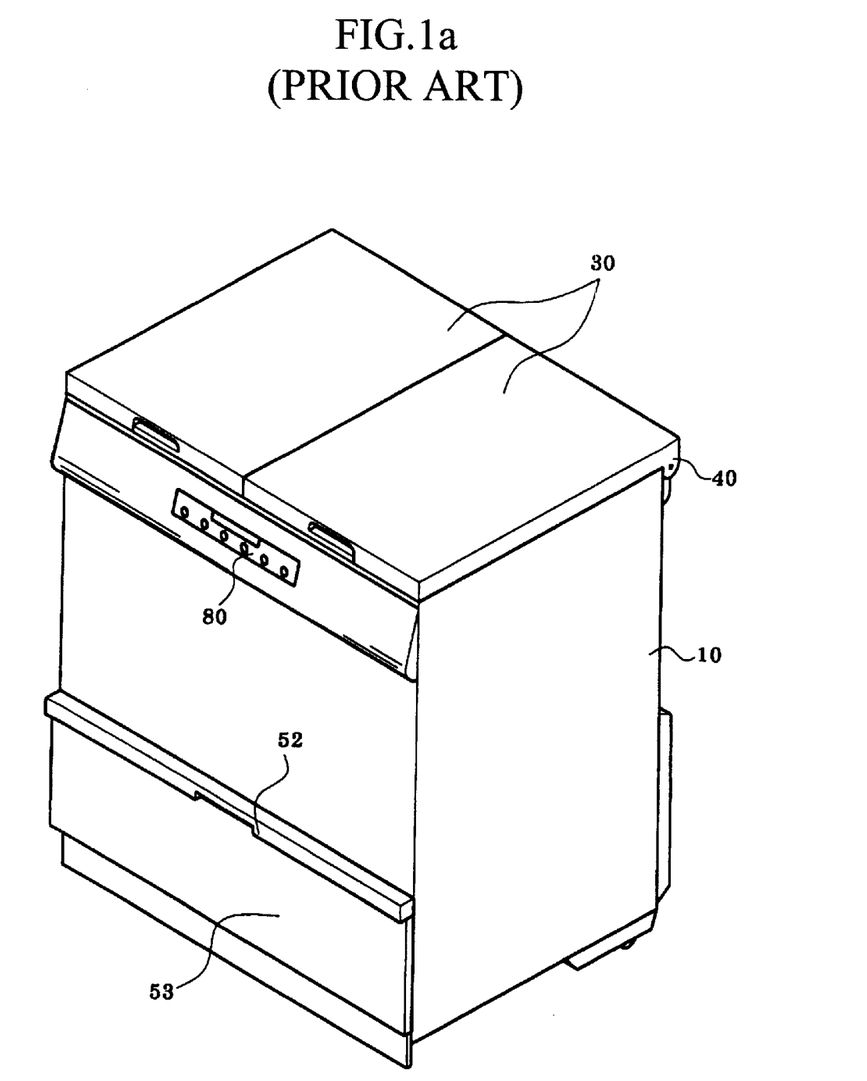
FIGS. 1a and 1b are perspective view and sectional view of the conventional compound type Kim-chi refrigerator respectively.
Figure 1B:
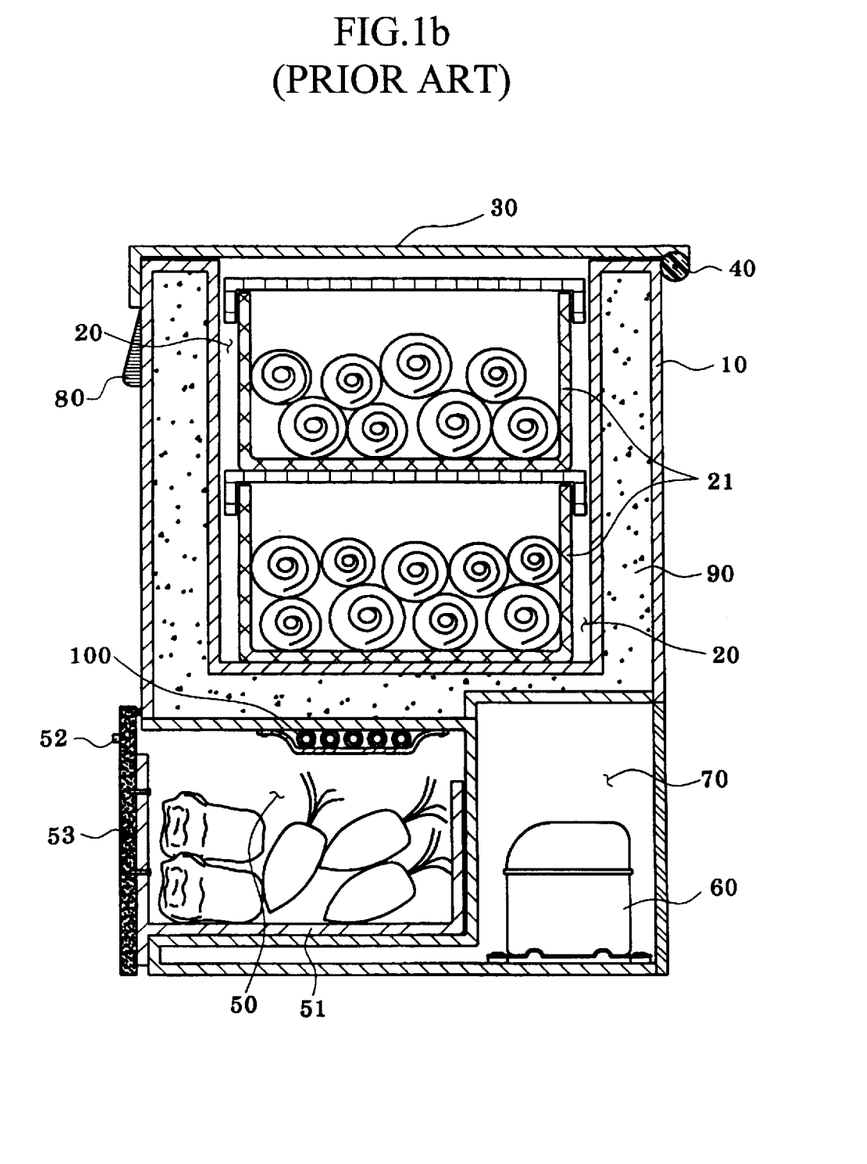

The conventional compound type Kim-chi refrigerator has the same structure as shown in the FIGS. 1a and 1b.

As illustrated in FIGS. 1a and 1b, generally there are two Kim-chi storage rooms 20 divided on the upper part of body 10 of the Kim-chi refrigerator that constitutes the outer appearance, and there is a mounted hinge 40 on the upper part of the back of body 10 in order to open and close by lifting the two upper door 30 upwards, which enables the two Kim-chi storage rooms 20 to open and close.

In Kim-chi storage room 20, the separate Kim-chi storage vessels 21 is inserted to ripen and store Kim-chi.

Also, on the lower portion of the Kim-chi storage rooms 20, a drawer 53 providing the drawer type storage room 50 is positioned. Usually, this drawer type storage room 50 is designed mainly to store vegetable chamber. This vegetable chamber maintains the indoor temperature from the cool air supplied from the evaporator 100 installed separately.

This drawer type storage room 50 is structured so that mostly vegetables and fruits, etc. can be kept fresh, and the drawer type storage room 50 is built in a way that it is equipped with a handle 52 wholly conjoined with a drawer 53 in order to open and close the receipt barrel 51 which can store and maintain vegetables, etc. In addition, on the backside of the drawer type storage room 50, a machine room 70 is separately positioned where the compressor 60 and a condenser are set in place for the cooling unit.

The control for all the Kim-chi refrigerator operation is attained by the modulating panel 80 provided on the front side of the body 10, and the insulating material 90 is filled inside the body 10 through the foaming molding to raise the insulating effect from the exterior air.

Meanwhile, since the compounded Kim-chi refrigerator with two Kim-chi storage rooms 20 and the drawer type storage room 50 as the above mentioned is fully equipped with an evaporator 100 that supplies cool air in each interior space, a solenoid valve is provided in order to smoothly supply the refrigerants by modulating the flow of the refrigerants by each evaporator.

Figure 2:
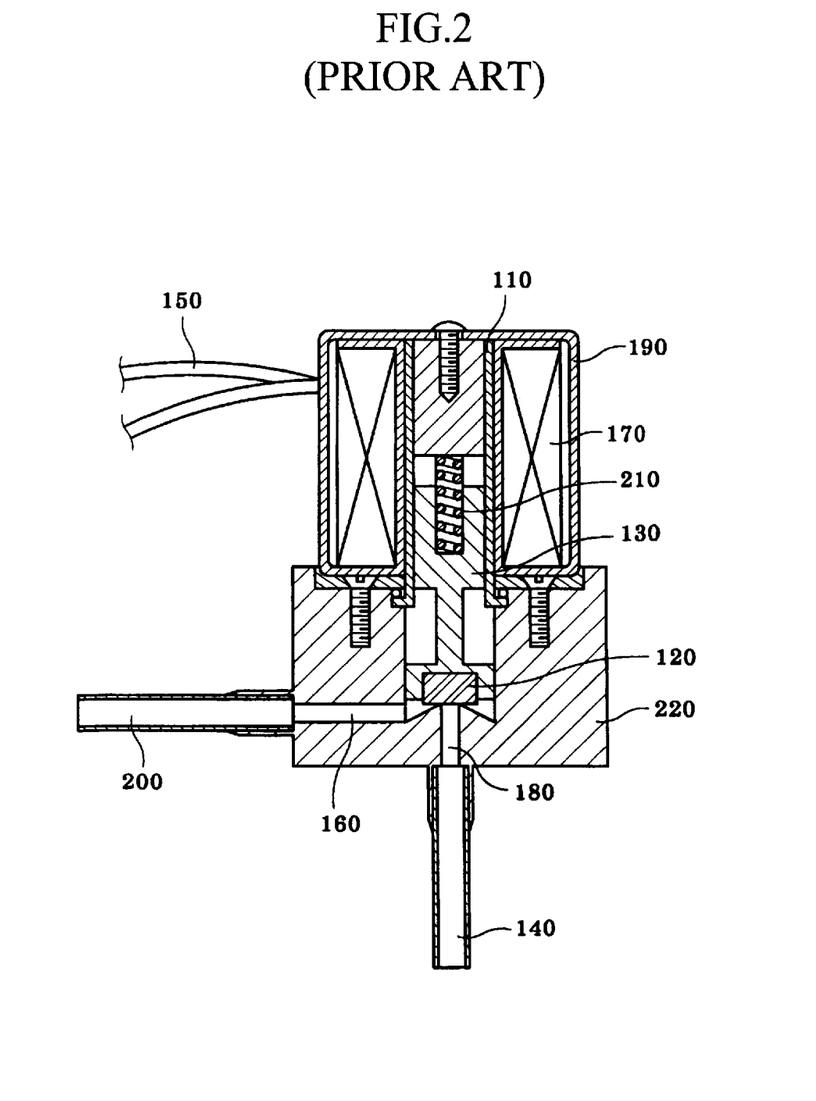
FIG. 2 is a sectional view showing a solenoid of prior art.

At this point, by briefly examining the structure of the solenoid valve used in the conventional Kim-chi refrigerator, as it is shown in FIG. 2, this is composed of the valve body 220 with the inlet port 160 and the outlet port 180 through which the refrigerants are flown and emitted, the cylinder 110 installed adhesively to this valve body 220, the plunger 130 which closes the inlet port 160 through the lower edge sealing cap 120 by the pressure of spring 210, and the cover 190 embedded with the coil 170 possible of the refrigerants to flow by pulling the plunger 130, magnetized by the exterior power transmitted through the wire 150.

Then, since the inlet port 160 and the outlet port 180 are connected with the inlet pipe 200 and the outlet pipe 140 each coupled with the refrigerant hose, as the coil 170 is charged with electricity, and the plunger 130 overcomes the power of spring 210 to be raised, the refrigerants flown through the inlet pipe 200 are emitted out of the flow-out pipe 140 through the inlet port 160 and the outlet port 180, making the refrigerants flow.

On the other hand, in case of applying the solenoid valve constituted as aforementioned to the compound type Kim-chi refrigerator, three solenoid valves are usually furnished corresponding to every evaporator installed in three space.

Nevertheless, in composing each of the three solenoid valve separately to correspond with each evaporator, there is an obvious discrepancy that this structure becomes very complicated, and there is another problem where setting in each solenoid valve inside the machine room loses its assembling efficiency.

SUMMARY OF THE INVENTION

The objective of this invention is to provide a solenoid valve supporter of Kim-chi refrigerator supported with a number of (for example, three pieces) solenoid valves to discharge the refrigerants flown through one inlet pipe to every solenoid valve by establishing plurality solenoid valves in one supporter body and provide the solenoid valves of Kim-chi refrigerator with very simple structure by emitting the refrigerants to the corresponding evaporator through the outlet pipe according to the controlled amount in every solenoid valve.

Another objective of this invention to provide a solenoid valve supporter of Kim-chi refrigerator capable of enhancing the assembling efficiency by fixing the simple structured solenoid valve on the wall of the machine room using one bracket.

In addition, the other objective of this invention to provide a solenoid valve supporter of Kim-chi refrigerator capable of preventing the noise occurring from the solenoid valve being transmitted to the machine room wall surface through the bracket by inserting the sound-absorbing material between the bracket and the machine room wall surface in fixing the solenoid valve on the machine room wall surface by using the bracket.

In accordance with this present invention a solenoid valve supporter of Kim-chi refrigerator Kim-chi refrigerator Consisting of the first two Kim-chi storage rooms with opening and shutting type upper door respectively and a drawer consisting a third Kim-chi storage room as a vegetable chamber for storing the vegetables and fruits, a compressor for compressing the refrigerant, a condenser for condensing and liquefying the compressed refrigerant, a plurality of evaporators corresponding to the first to third Kim-chi storage rooms in the machine room, and a plurality of solenoid valves which can modulate the flow path of the refrigerants supplied to the plurality of evaporators, which comprise: a solenoid valve supporter for supporting the plurality of solenoid valves corresponding to every evaporator, wherein the plurality solenoid valves are positioned on the solenoid valve supporter with the same intervals to each other, and the solenoid valve supporter comprising: a supporter body having an inlet port which forms the lower edge central portion of the supporter body and a plurality of outlet ports formed corresponding to each solenoid valve, an inlet pipe which sends the refrigerants from the condenser to every solenoid valve via inlet holes inside the supporter body, and numerous outlet ports which send the refrigerants from each solenoid valve to every evaporator via outlet holes inside the supporter body.

It is preferable that the Kim-chi refrigerator further comprising a bracket for mounting the solenoid supporter with numerous solenoid valves inside the wall of the machine room, wherein the bracket comprises: a vertical slat combined in the adhesive condition with the inside the wall of the machine room, a horizontal slat formed integrally with the vertical slat and prolonged in a rectangular direction and inserted adhesively to the concave portion formed on the central portion of the upper surface of the supporter body to be connected and combined through the screw hole formed on the central portion of the upper surface of the supporter body.

And, it is preferable that the Kim-chi refrigerator further comprising a sound-absorbing material in the installation of the solenoid valve supporter with solenoid valves on the inside wall of the machine room by the bracket, the sound-absorbing material is inserted between the vertical slat of the bracket and the inside wall of the machine room to prevent the noise occurring from the solenoid valves from being transmitted to the inside wall of the machine room through the bracket.

BRIEF DESCRIPTION OF DRAWINGS

Other objectives and aspects of the present invention will become apparent from the following description of the embodiments with reference to the accompanying drawing in which.

DESCRIPTION OF THE PREFERRED EMBODIMENTS

Figure 3:
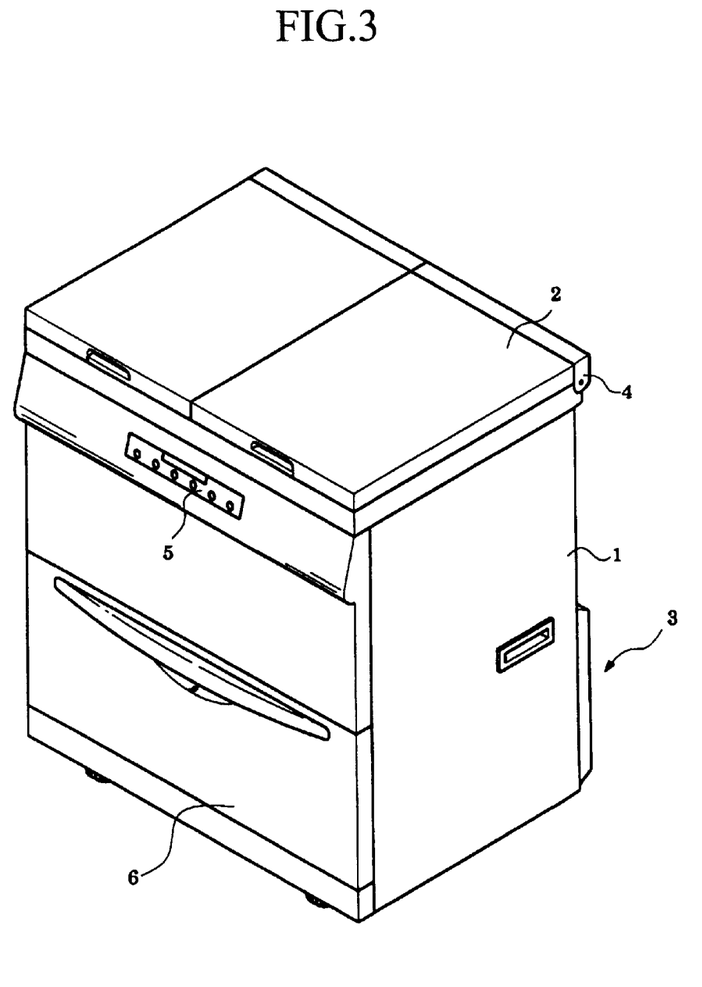
FIG. 3 is a perspective view of a compound type Kim-chi refrigerator according to the present invention.

As shown in the FIG. 3, the constitution of the compound type Kim-chi refrigerator with this invention applied is substantially similar to the constitution explained in the conventional technology.

The compound type Kim-chi refrigerator according to the present invention has the first and second Kim-chi storage rooms R1 and R2 ripening and refrigerating Kim-chi, prolonged and formed to the lower part vertically, and on the first and the second storage rooms, each door 2 is installed possible of opening and shutting to the upper portion of the body 1 by the hinge 4. Meanwhile, the drawer 6 providing a third Kim-chi storage room is designed to be used mainly as the vegetable chamber for storing the vegetables and Kim-chi. Hereinafter, the third Kim-chi storage room also refers to a vegetable chamber. This vegetable chamber is supplied with the cool air from the evaporator established separately to maintain the indoor temperature.

Figure 4:
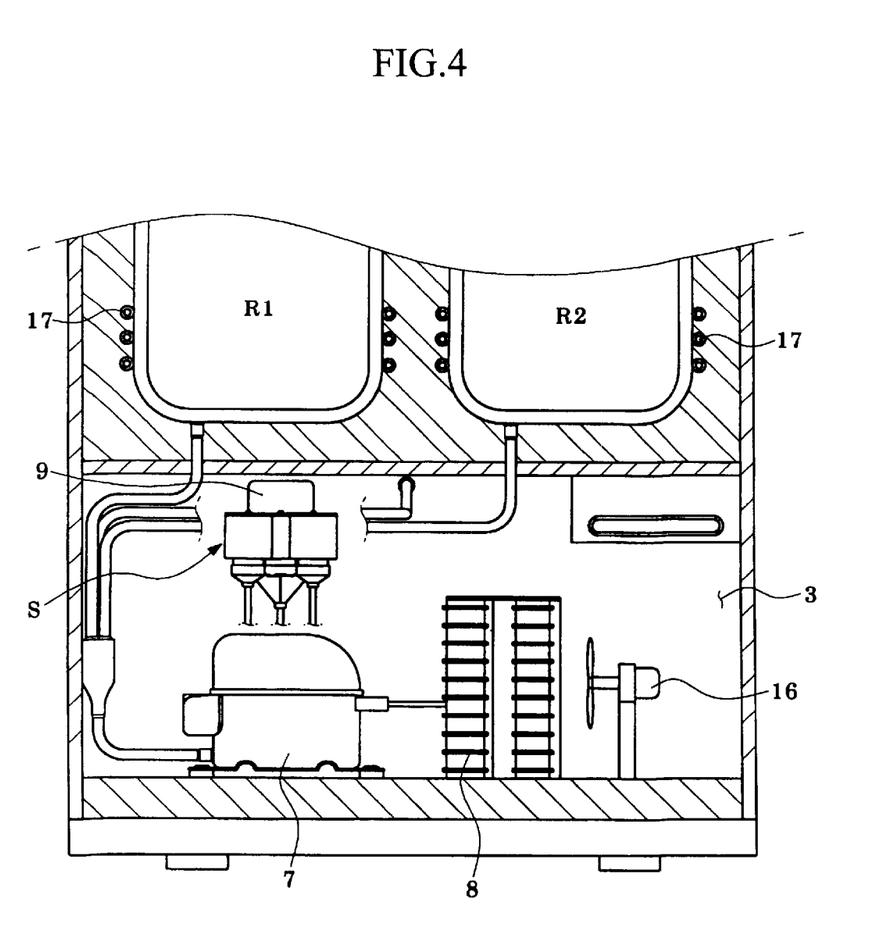
FIG. 4 is an partially sectional view showing a structure for mounting a solenoid valve supporter with solenoid valves on an inside wall of a machine room in accordance with the present invention.

As shown is FIG. 4, The vegetable chamber of the drawer type Kim-chi refrigerator plays the role of receipt vessel capable of receiving the vegetable etc, and on the back side of the vegetable chamber, the machine room 3 provided with the compressor 7 for compressing the refrigerants and the condenser 8 for condensing the compressed refrigerants in the compressor 7 is divided and formed. Also, the solenoid valve supporter S and blowing fan 16 needed in the cooling cycle are mounted on the machine room 3.

Figure 5:
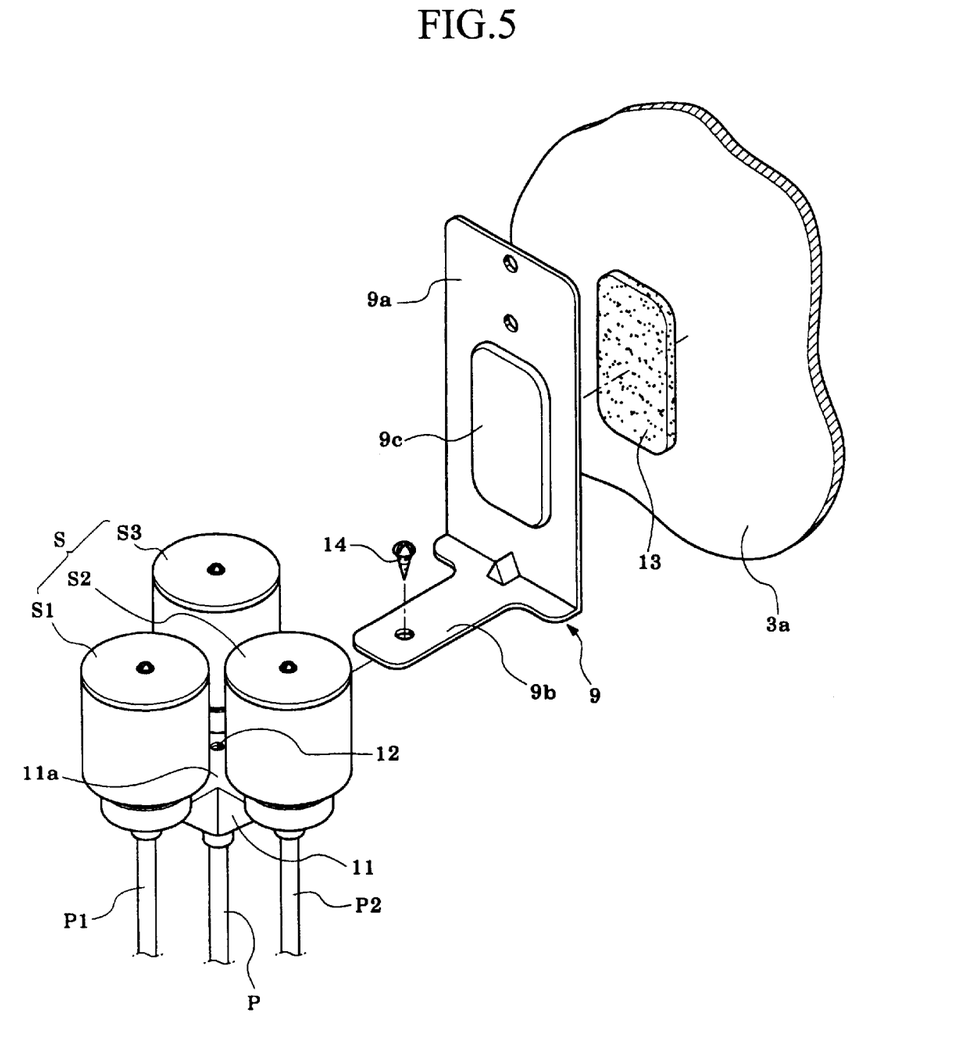
FIG. 5 is an exploded perspective view showing the solenoid valve supporter and bracket for fixing solenoid valves in accordance with the present invention.
Figure 6:
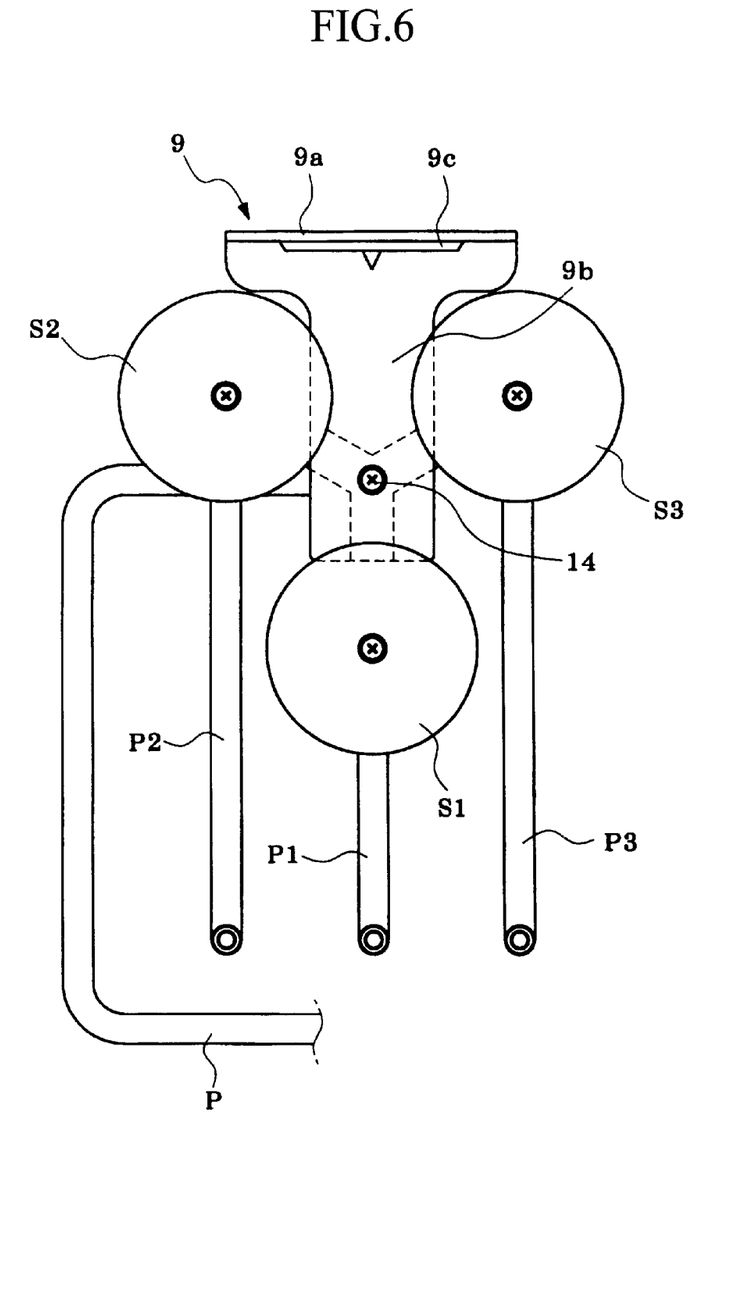
FIG. 6 is a front view showing the solenoid valves fixed on the supporter with the bracket of FIG. 5.

As shown is FIGS. 5 and 6, at this point, the solenoid valve supporter S is supported of three solenoid valves S1, S2, and S3 corresponding to every evaporator 17 mounted on the first and the second Kim-chi storage rooms R1 and R2 and the third Kim-chi storage room.

At this time, one supporter body 11 fixes the three-solenoid valves S1, S2, and S3. Also, the solenoid valves S1, S2, and S3 are positioned to be diverged with each other with 120° intervals from the central portion of the supporter body 11. That is, the supporter body 11 structurally diverged in the form of wing with 120° intervals with the central portion taking the triangular horn form as a standard. On the edge portion diverged in the form of wing in three directions, three solenoid valves S1, S2, and S3 are positioned.

Meanwhile, a bracket 9 is provided in the form proper to the structure of the solenoid valve supporter S to install three solenoid valves S1, S2, and S3 mounted on the supporter body 11 within the machine room 3.

The bracket 9 plays the role of attaching the solenoid valve supporter S inside wall 3a of the machine room 3. This bracket 9 is composed of the vertical slat 9a adhesive to the inside wall 3a of the machine room 3 and the horizontal slat 9b formed integrally with this vertical slat 9a and prolonged at right angles.

At this time, the horizontal slat 9b is inserted adhesively to the 11 concave portion 11a formed on the upper side central portion of the supporter body 11, and connected to the screw hole formed on the center of the supporter body 11 by the screw 14. The width of the horizontal slat 9b adhesive to the supporter body 11 is formed more narrow than the width of the vertical slat 9a, considering the intervals of the supporter body 11 diverged in 120°.

Also, in establishing the solenoid valve supporter S fixed inside wall 3a of the machine room 3a by using bracket 9, the sound-absorbing material 13 is inserted between the bracket 9 and the inside wall 3a of the machine room 3 to prevent the noise occurring from the solenoid valve supporter S from being transmitted to the inside wall 3a of the machine room 3a through the bracket 9, and for this the placing portion 9c capable of inserting the sound-absorbing material 13 to the vertical slat 9a of the bracket is protruded and formed to the front direction.

Figure 7:
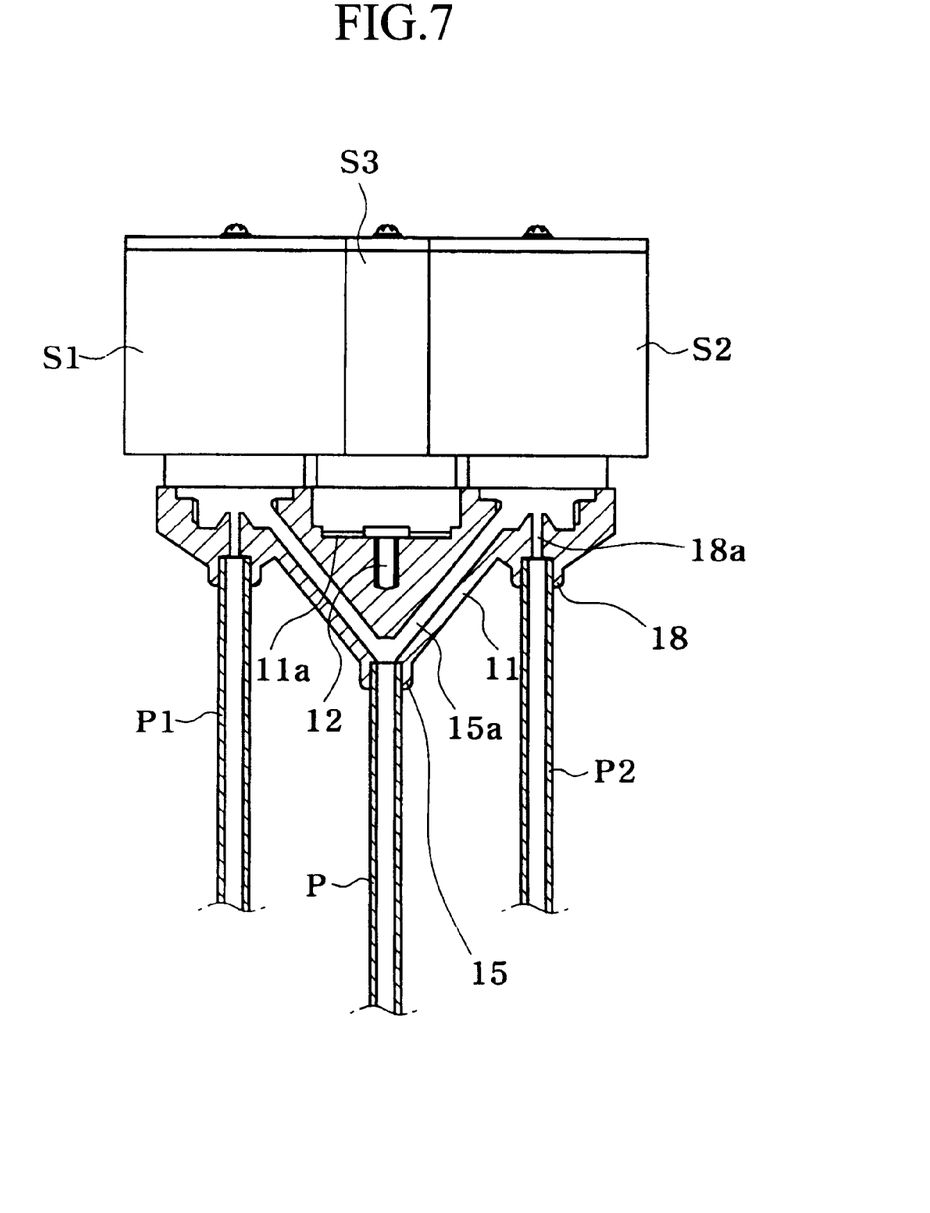
FIG. 7 is a sectional view showing the solenoid valves fixed on the supporter with the bracket of FIG. 5.

As shown in FIG. 7, the solenoid valve supporter S comprises the supporter body 11 having a inlet port 15 formed the lower edge central portion of the supporter body 11 and a plurality of outlet ports 18 formed corresponding to the every solenoid valve S1, S2, and S3, an inlet pipe P which sends the refrigerants from the condenser 8 to the every solenoid valve S1, S2, and S3 via inlet holes 15a inside the supporter body 11, and a plurality of outlet ports 18 which sends the refrigerants from each solenoid valve S1, S2, and S3 to every evaporator 17 via outlet holes 18a inside the supporter body 11.

The inlet holes 15a are branched and formed in three directions (120° intervals) from the inlet port 15 connected with the inlet pipe P to every solenoid valve S1, S2, and S3. The inlet holes 18a penetrated through the solenoid valves S1, S2, and S3 are vertically elongated form every solenoid valves S1, S2, and S3 to the outlet ports 18 connected to the outlet pipes P1, P2, and P3.

According to this invention, in the condition that the solenoid valves S; S1, S2, and S3 are positioned with the same intervals and jointed on the supporter body 11, through the inlet pipe P connected to the supporter body 11 and the outlet pipes P1, P2, and P3 connected to every solenoid valve S1, S2, and S3, the refrigerants which mediate the cooling cycle possibility of flowing and moving freely, and at this time, the solenoid valves S1, S2, and S3 send the refrigerants to every evaporator 17 the same as the solenoid valves maintaining the conventional independent form by modulating the refrigerants amount, controlled by the microcomputer(not shown).

Since the supporter body 11 and the solenoid valve S take the jointed structure, as well as the structure itself is very simplified than the solenoid valves S1, S2, and S3 which are existing independently, and in constructing and attaching to the inside wall 3a of the machine room 3, the bracket 9 can be used simply by having the profit of raising the construction intensity.

According to this invention as above mentioned, by positioning and jointing the solenoid valves on one supporter in one structure, the structure itself is very simplified as well as completely guaranteeing the functional quality of the original solenoid valve to minimize the space which the solenoid valve takes in installing on the inside wall of the machine room with the profit of relieving the intervention with the other components.

Also, the use of one bracket makes the construction intensity proficient with the profit of reducing the cost in the aspect of the production cost price.

Meanwhile, in attaching the solenoid valve to the inside wall of the machine room through the bracket, mediating of the sound-absorbing material can prevent the noise occurring from the solenoid valve from being transmitted to the inside wall of the machine room with the effect of noise reduction.

What is claimed is:

1. A Kim-chi refrigerator consisting of two first Kim-chi storage rooms, each with opening type and shutting type upper doors and a drawer consisting of a third Kim-chi storage room serving as a vegetable chamber for storing vegetables and fruits, a compressor for compressing a refrigerant, a condenser for condensing and liquefying the refrigerant, a plurality of evaporators corresponding to the first through the third Kim-chi storage rooms, respectively in a machine room, and numerous solenoid valves which can modulate the flow path of the refrigerants supplied to the numerous evaporators, which comprise:

a solenoid valve supporter for supporting the numerous solenoid valves to each of the corresponding evaporators, wherein the plurality of solenoid valves are positioned on the solenoid valve supporter with the same relative intervals to each other, and the solenoid valve supporter comprising:

a supporter body having an inlet port formed on a lower edge central portion of the supporter body and numerous outlet ports formed corresponding to each solenoid valve, an inlet pipe which sends the refrigerant from the condenser to each solenoid valve via inlet holes inside the supporter body, and numerous outlet ports which send the refrigerant from each solenoid valve to each evaporator via outlet holes inside the supporter body.

2. A Kim-chi refrigerator of claim 1, further comprising a bracket for mounting the solenoid supporter with the numerous solenoid valves to a wall of the machine room, wherein the bracket comprises:

a vertical slat adhered to the inside wall of the machine room, a horizontal slat formed integrally with the vertical slat and prolonged in a rectangular direction and inserted adhesively to a concave portion formed on a central portion of an upper surface of the supporter body to be connected and combined through a screw hole formed on the central portion of the upper surface of the supporter body.

3. A Kim-chi refrigerator of claim 2, further comprising a sound-absorbing material installed inside the solenoid valve supporter with solenoid valves on the inside wall of the machine room by the bracket, the sound-absorbing material being inserted between the vertical slat of the bracket and the inside wall of the machine room to prevent noise occurring from the solenoid valves from being transmitted to the inside wall of the machine room through the bracket.

* * * * *